A. T. PRESCOTT.
CLUTCH FOR POWER WINCHES.
APPLICATION FILED JULY 3, 1911.
1,158,555.
Patented Nov. 2, 1915.
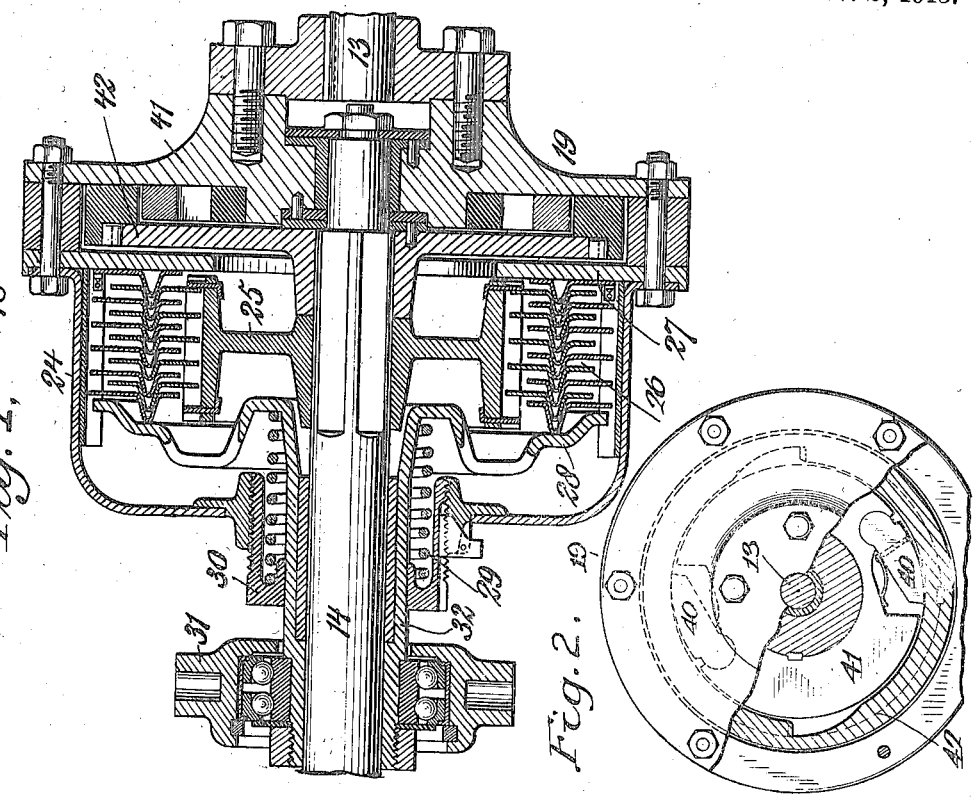
WITNESSES:
F. B. Graves
Lyman S. Andrews Jr.
INVENTOR
Arthur T. Prescott
Chapin & Haynes
His ATTORNEYS

UNITED STATES PATENT OFFICE.

ARTHUR T. PRESCOTT, OF EAST ORANGE, NEW JERSEY, ASSIGNOR TO GEORGE H. FROTHINGHAM COMPANY, OF NEW YORK, N. Y., A CORPORATION OF NEW YORK.

CLUTCH FOR POWER-WINCHES.

1,158,555. Specification of Letters Patent. Patented Nov. 2, 1915.

Application filed July 3, 1911. Serial No. 636,657.

*To all whom it may concern:*

Be it known that I, ARTHUR T. PRESCOTT, a citizen of the United States of America, and a resident of East Orange, county of Essex, and State of New Jersey, have invented certain new and useful Improvements in Clutches for Power-Winches, of which the following is a specification, reference being had to the accompanying drawings, forming a part thereof.

My invention relates to clutches, and particularly to a type of clutch for a winch adapted to be operated by an electric motor and to be used for the purpose of mooring ferry boats to bridges, and for similar and analogous purposes.

My invention consists in many novel details of construction and combinations of parts, including an overload safety release mechanism for connecting the parts in driving relation in one direction, and positive means for connecting the parts when moving in the other direction, whereby the parts will slip under an excess load in one direction of drive but will not so slip in the other direction of drive; and in order that my invention may be fully understood I will now proceed to describe a structure constituting an embodiment thereof, having reference to the accompanying drawings illustrating the same, and will then point out the novel features in claims.

In the drawings: Figure 1 is a view in central longitudinal section of safety and uni-direction clutch mechanisms constructed in accordance with my invention. Fig. 2 is a view in partial transverse vertical section of the uni-direction clutch shown in Fig. 1.

13 represents the shaft of a driving motor (not shown) and is arranged longitudinally in line with the operating shaft 14 of a driven mechanism such as a winch. Between the adjacent ends of the shafts 13 and 14 is an over-load safety clutch 18 and a uni-direction clutch 19.

The safety clutch 18 comprises a cylindrical casing element 24 secured fast to the shaft 13, a hub 25 secured fast to the shaft 14, and a plurality of alternately arranged friction disks 26 disposed between them. These disks are disposed endwise between a disk or plate 27 secured to, or formed as a part of, the casing 24, and a head 28, a spring 29 being disposed between a hub 30 carried by the casing 24 and the said head 28, whereby the said head is normally forced toward the plate 27 to press the disks into intimate frictional engagement. An operating head 31 is mounted upon the hub 32 of the head 28 by which the head 28 may be moved in a direction away from the plate 27 to relieve the endwise pressure upon the disks and hence to release them from frictional engagement, when desired. The parts are shown in their normal position in the drawings, the spring being free to exert its pressure upon the clutch disks to press them together. The tension of the spring is regulated by the position of the head 30 which head is made adjustable for the purpose of adjusting such tension to the required degree. If it is desired to release the clutch the operating head 31 is moved to the left as viewed in Fig. 1, to thereby compress spring 29 which otherwise forces the friction disks 26 together.

The clutch mechanism just described (and it may be here noted that other forms of clutch mechanism may of course be used in lieu thereof, if desired, the form shown in the drawings being a conventional representation of the well-known Hele-Shaw clutch now on the market) forms a driving connection through which a limited amount of power may be transmitted, and after the limit of its capacity has been reached, such capacity being of course determined by the strength of the spring 29 and the adjusted position of the head or hub 30, the clutch will permit slipping between the parts whereby should the motor continue to run and turn the shaft 13 after the shaft 14 has reached the limit of its movement, no harm will be done. In other words, say, for instance, that the device is interposed between an electric driving motor and a mooring winch and is employed for mooring a ferry boat in place in its slip, then if the cable from the winch drum be connected with the ferry boat and the motor started, a failure to stop the motor when the boat is in the limit of its position and the rope is all taut, will not result in a breakage, strain, or other damage of the parts, the motor merely continuing to exert a uniform tension upon the mooring cables.

When a winch is to be moved in the other direction, as for releasing the mooring connection of the ferry boat or other object, it is necessary to provide some driving mechanism between the motor and the driving shaft such as will transmit greater power than will be transmitted by the clutch when the same is being operated in the previously described direction, because the momentum of the parts at the time of winding up, producing as it will such a powerful wedging action between the teeth of the worm and worm wheel, may so jam the parts as to require a relatively greater power to release them. For this purpose I have provided a positive drive connection over the safety clutch through which the power of the motor will be transmitted to the driving shaft when operating in a reverse direction. This positive driving connection is here shown in the form of a uni-direction or ratchet clutch and comprises two pawls 40 carried by a flange 41 of the casing 24 (which it will be remembered is connected fast with the shaft 13), and a notched flange or ratchet 42 which is secured fast to the shaft 14.

The relationship of the pawls with the notches or teeth of the ratchet or flange is such as to provide a positive driving connection when the motor is driven in a direction to unwind the cable on the winch drum, and to slip freely when the motor is running in a direction to wind up the cable thereon. Thus, in the direction for winding up the power is transmitted solely through the friction clutch, while in the opposite direction the power is transmitted through the friction clutch and the pawls of the uni-direction clutch. The uni-directional clutch however does not come into action unless the friction clutch slips. Such a connection is particularly efficient in its combination with the electric motor because an electric motor of the type employed may be temporarily overloaded to a considerable extent, whereby sufficient power will be readily provided for positively releasing the parts, while at the same time such a motor being normally arranged to run under less load an economy of operation results. It will also be noted that in the particular construction shown there are but two notches or teeth in the flange or ratchet so that in any event there is likely to be some movement of the motor before it picks up its full load. During this first movement the driving connection will of course be through the friction clutch, and if the parts are jammed so that that clutch will slip there will be no movement of the shaft 14 until the pawls slip into place. When they do thus take hold there will be the additional momentum of the parts carried by the motor shaft 13 by which there will be a hammer-like blow of the pawls against the ratchet, all of which will help to start the parts in a direction to release them, and of course once started less and less power will be required to cause them to continue their movement. It will also be noted that the construction of the device, as a whole, is very simple and that there are but few parts, and those but little likely to get out of order. The casing as a whole incloses and protects the parts, and the casing is also preferably in such form as to retain oil so that the working parts may run in oil.

What I claim is:

1. The combination with a reversible driving shaft and a driven shaft, of a safety overload clutch for connecting said shaft in either direction of rotation, self-acting means for positively connecting said shaft in only one direction of rotation and means for throwing the safety overload clutch into action.

2. The combination with a reversible driving shaft and a driven shaft, of a safety overload clutch for connecting said driven shaft with the driving shaft when the driving shaft is running in either direction, a self-acting clutch for positively connecting the driven shaft with the driving shaft when the driving shaft is running in only one direction, and means for throwing the safety overload clutch into action.

3. The combination with a reversible driving shaft, of a safety overload clutch for connecting said driven shaft with the driving shaft when the driving shaft is running in one direction, manually actuated means for controlling said clutch, and an automatically actuated positive connecting means for connecting the driven shaft with the driving shaft when the driving shaft is running in the opposite direction.

4. The combination with a reversible driving shaft and a driven shaft, of a self-acting positive uni-direction clutch between the driving shaft and the driven shaft, a friction clutch also between the driving shaft and the driven shaft, and a manually actuated device for controlling the action of the friction clutch.

5. The combination with a driving shaft and a driven shaft, of a positive automatically actuated uni-direction clutch between the driving shaft and the driven shaft, and a manually actuated friction clutch also between the driving shaft and the driven shaft.

6. The combination with a driving shaft and a driven shaft, of a safety overload clutch between the driving shaft and the driven shaft, and a connecting device operative when the driving shaft is running in one direction having means for providing for a limited amount of lost motion between the driving shaft and the driven shaft and thereafter a positive driving connection.

7. The combination with a reversible driving shaft, a driven shaft and a self-acting positive uni-direction clutch for connecting said shafts, of a spring-actuated safety-overload friction clutch for establishing a non- positive operative connection between said shafts, and means for releasing the spring-actuated friction clutch.

ARTHUR T. PRESCOTT.

Witnesses:
  D. E. DEUTSCH,
  A. C. DAVIS.